(12) United States Patent
Xu et al.

(10) Patent No.: US 9,622,229 B2
(45) Date of Patent: *Apr. 11, 2017

(54) NETWORK RELAY SIGNALING FOR DOWNLINK TRANSPARENT RELAY

(75) Inventors: Hua Xu, Ottawa (CA); Jianglei Ma, Ottawa (CA); Ming Jia, Ottawa (CA); Hang Zhang, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,385

(22) Filed: Sep. 14, 2012

(65) Prior Publication Data

US 2013/0070583 A1    Mar. 21, 2013

Related U.S. Application Data

(63) Continuation of application No. 12/887,127, filed on Sep. 21, 2010, now abandoned, which is a (Continued)

(51) Int. Cl.
*H04W 72/04* (2009.01)
*H04B 7/155* (2006.01)
*H04B 7/26* (2006.01)

(52) U.S. Cl.
CPC .......... *H04W 72/042* (2013.01); *H04B 7/155* (2013.01); *H04B 7/2606* (2013.01)

(58) Field of Classification Search
None
See application file for complete search history.

(56) References Cited

U.S. PATENT DOCUMENTS

| 7,639,639 B2 | 12/2009 | Herdin |
| 8,050,235 B2 | 11/2011 | Kang et al. |

(Continued)

FOREIGN PATENT DOCUMENTS

| CN | 101345568 | 1/2009 |
| WO | 2010/017628 | 2/2010 |

(Continued)

OTHER PUBLICATIONS

Nortel; "More Design Aspect on Dowlink Transparent Relay in LTE-A" (R1-083866); 3GPP TSG-RAN1 Meeting #54bis; Prague, Czech Republic; Sep. 29-Oct. 3, 2008.

(Continued)

*Primary Examiner* — Steve Young
(74) *Attorney, Agent, or Firm* — Fish & Richardson P.C.

(57) ABSTRACT

In a method of providing downlink retransmissions to a mobile station in a wireless communication network, the wireless communication network comprising a base station communicatively linked to a transparent relay station, the base station receives a request for a retransmission from the mobile station; schedules resources for the retransmission; signals scheduling information for the retransmission to the transparent relay station via a control link; and the transparent relay station receives the scheduling information for the retransmission on the control link; and sends the retransmission to the mobile station in a retransmit subframe on a retransmit frequency band.

8 Claims, 10 Drawing Sheets

Related U.S. Application Data continuation-in-part of application No. 12/806,218, filed on Sep. 21, 2009, now Pat. No. 8,472,366.

(60) Provisional application No. 61/098,840, filed on Sep. 22, 2008.

(56) References Cited

U.S. PATENT DOCUMENTS

| | | | |
|---|---|---|---|
| 8,089,887 B2* | 1/2012 | Lippman et al. | 370/246 |
| 8,108,893 B2 | 1/2012 | Haberman et al. | |
| 8,274,923 B2 | 9/2012 | Shen et al. | |
| 8,700,023 B2* | 4/2014 | Nan | H04B 7/2606 370/230 |
| 2003/0227946 A1 | 12/2003 | Schwarz et al. | |
| 2004/0192204 A1 | 9/2004 | Periyalwar et al. | |
| 2005/0232183 A1 | 10/2005 | Sartori et al. | |
| 2007/0098102 A1 | 5/2007 | Hottinen | |
| 2007/0153734 A1 | 7/2007 | Lee et al. | |
| 2007/0155315 A1 | 7/2007 | Lee et al. | |
| 2008/0049718 A1 | 2/2008 | Chindapol et al. | |
| 2008/0068979 A1 | 3/2008 | Visotsky | |
| 2008/0076433 A1 | 3/2008 | Cheng et al. | |
| 2008/0227386 A1 | 9/2008 | Dayal et al. | |
| 2008/0240014 A1 | 10/2008 | Chang et al. | |
| 2009/0175369 A1 | 7/2009 | Atarashi et al. | |
| 2009/0201846 A1 | 8/2009 | Horn et al. | |
| 2009/0233544 A1 | 9/2009 | Oyman et al. | |
| 2009/0252088 A1 | 10/2009 | Rao et al. | |
| 2009/0257449 A1* | 10/2009 | Chen et al. | 370/470 |
| 2009/0262678 A1 | 10/2009 | Oyman et al. | |
| 2010/0034158 A1 | 2/2010 | Meylan | |
| 2010/0162069 A1* | 6/2010 | Niu et al. | 714/748 |
| 2010/0278121 A1 | 11/2010 | Chun et al. | |
| 2010/0331037 A1* | 12/2010 | Jen | H04W 52/146 455/522 |
| 2011/0019608 A1 | 1/2011 | Dohler et al. | |
| 2011/0029833 A1 | 2/2011 | Zhang et al. | |
| 2011/0038302 A1* | 2/2011 | Papasakellariou | H04L 5/0007 370/315 |
| 2011/0126071 A1 | 5/2011 | Han et al. | |
| 2011/0170489 A1* | 7/2011 | Han | H04B 7/0671 370/328 |
| 2011/0222428 A1* | 9/2011 | Charbit et al. | 370/252 |
| 2011/0292865 A1* | 12/2011 | Seo et al. | 370/315 |
| 2012/0026935 A1* | 2/2012 | Park | H04L 1/1854 370/315 |
| 2012/0093061 A1 | 4/2012 | Charbit et al. | |
| 2013/0286932 A1 | 10/2013 | Zhang et al. | |

FOREIGN PATENT DOCUMENTS

| | | |
|---|---|---|
| WO | 2010/026287 | 3/2010 |
| WO | 2010/124605 | 11/2010 |

OTHER PUBLICATIONS

Office Action issued in U.S. Appl. No. 12/806,218 on Mar. 13, 2012; 6 pages.

Office Action issued in U.S. Appl. No. 12/806,218 on Sep. 5, 2012, 2012; 6 pages.

International Search Report and Written Opinion of the International Searching Authority issued in International Application No. PCT/CA2010/001508 on May 25, 2011.

International Preliminary Report on Patentability issued in International Authority No. PCT/CA2010/001508 on Mar. 27, 2012; 7 pages.

Nortel: "Some Further Consideration for DL transparent Relay in LTE-A" (R1-084462); 3GPP TSG-RAN1 Meeting #55; Prague, Czech Republic, Nov. 10-14, 2008; 6 pages.

Notice of Allowance issued in U.S. Appl. No. 12/806,218 on Jan. 8, 2013; 8 pages.

Office Action issued in U.S. Appl. No. 12/887,127 on Jun. 20, 2012; 17 pages.

Office Action issued in U.S. Appl. No. 12/887,127 on Jan. 3, 2013; 17 pages.

Office Action issued in Japanese Application No. 2012-529082 on Jan. 29, 2014; 4 pages. No translation.

Office Action issued in U.S. Appl. No. 13/620,632 on Apr. 14, 2014; 11 pages.

Office Action issued in Russian Application No. 2012110922 on Sep. 28, 2014; 6 pages.

Notice of Allowance issued in Russian Application No. 2012110922 on Dec. 17, 2014; 9 pages.

Office Action issued in Chinese Application No. 201080052608.9 on Oct. 8, 2014; 18 pages.

Office Action issued in U.S. Appl. No. 12/887,127 on Jul. 18, 2013; 23 pages.

Office Action issued in U.S. Appl. No. 13/620,632 on Jul. 22, 2014.

Office Action issued in Japanese Application No. 2012-529082 on Aug. 11, 2014; 2 pages. No translation.

Alcatei-Lucent Shanghai Bell; "Consideration on Type II Relay UE Selection and CRS Channel Estimations Performance"; 3GPP TSG-RAN1 #57bis (R1-092326); Jun. 24, 2009.

Office Action issued in related Canadian application No. 2,774,723 on Apr. 15, 2016.

Office Action issued in related Korean Application No. 10-2012-7010286 on Jan. 15, 2016.

Office Action issued in related Korean Application No. 10-2012-7010286 on May 10, 2016.

Reexamination Notification issued in Chinese Application No. 201080052608,9 on May 19, 2016.

Reexamination Notification issued in Chinese Application No. 201080052608.9 on Sep. 23, 2016.

Office Action issued in Korean Application No. 10-2012-7010286 on Jan. 31, 2017.

* cited by examiner

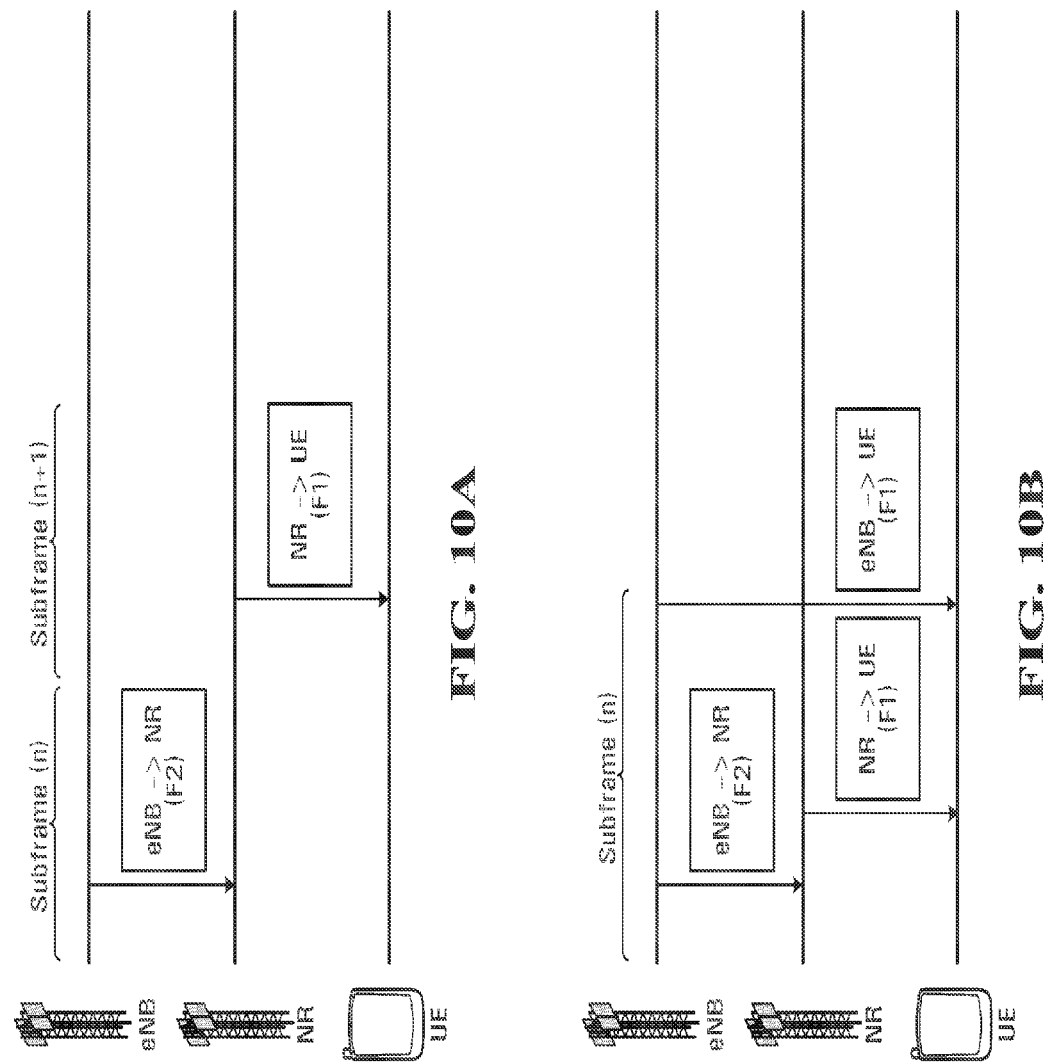

NETWORK RELAY SIGNALING FOR DOWNLINK TRANSPARENT RELAY

RELATED APPLICATIONS

This application is a continuation of U.S. Non-Provisional application Ser. No. 12/887,127, filed Sep. 21, 2010, which is a continuation-in-part of U.S. Non-Provisional application Ser. No. 12/806,218 resulting from conversion under 37 C.F.R. §1.53(c)(3) of U.S. provisional patent application No. 61/244,098 filed on Sep. 21, 2009, which claims the benefit of U.S. provisional patent application No. 61/098,840 filed on Sep. 22, 2008. The contents of which are incorporated by reference herein.

FIELD OF THE INVENTION

The present invention relates to wireless communications and more particularly to methods and systems for providing DL retransmissions to mobile stations in wireless communication networks employing transparent relay.

BACKGROUND

Wireless communication systems are widely deployed to provide various types of communication content such as voice, data, and other content. These systems may be multiple-access systems capable of simultaneously supporting communication for multiple wireless terminals by sharing the available transmission resources (e.g., frequency channel and/or time interval). Since the transmission resources are shared, efficient allocation of the transmission resources is important as it impacts the utilization of the transmission resources and the quality of service perceived by individual terminal users. One such wireless communications system is the Orthogonal Frequency-Division Multiple Access (OFDMA) system in which multiple wireless terminals perform multiple-access using Orthogonal Frequency-Division Multiplexing (OFDM).

OFDM is a multi-carrier modulation technique that partitions the overall system bandwidth into multiple orthogonal frequency subchannels, each of which is associated with a respective subcarrier that may be modulated with data. Because the subchannels are made orthogonal, some spectral overlap between the subchannels is permitted, leading to a high spectral efficiency. In OFDM systems, the user data stream is split into parallel streams of reduced rate, and each obtained substream then modulates a separate subcarrier.

In OFDMA, access to the shared wireless medium is scheduled using frames that extend over two dimensions: time, in units of symbols, and frequency, in units of logical sub-channels. Data bursts are conveyed in two-dimensional (i.e. time and frequency) data regions within the frame which are scheduled by the BS via specific control messages. Each frame is divided into downlink (DL) and uplink (UL) subframes. The former is used by the BS to transmit data to the MSs, whereas the MSs transmit to the BS in the latter.

Examples of OFDM communication systems include, but are not limited to, wireless protocols such as the wireless local area network ("WLAN") protocol defined according to the Institute of Electrical and Electronics Engineering ("IEEE") standards radio 802.11a, b, g, and n (hereinafter "Wi-Fi"), the Wireless MAN/Fixed broadband wireless access ("BWA") standard defined according to IEEE 802.16 (hereinafter "WiMAX"), the mobile broadband 3GPP Long Term Evolution ("LTE") protocol having air interface High Speed OFDM Packet Access ("HSOPA") or Evolved UMTS Terrestrial Radio Access ("E-UTRA"), the 3GPP2 Ultra Mobile Broadband ("UMB") protocol, digital radio systems Digital Audio Broadcasting ("DAB") protocol, Hybrid Digital ("HD") Radio, the terrestrial digital TV system Digital Video Broadcasting-Terrestrial ("DVB-T"), the cellular communication systems Flash-OFDM, etc. Wired protocols using OFDM techniques include Asymmetric Digital Subscriber Line ("ADSL") and Very High Bitrate Digital Subscriber Line ("VDSL") broadband access, Power line communication ("PLC") including Broadband over Power Lines ("BPL"), and Multimedia over Coax Alliance ("MoCA") home networking.

3GPP LTE defines the following physical channels:
Downlink (DL)
  Physical Broadcast Channel (PBCH): This channel carries system information for mobile stations (referred to as user equipment, or UE) requiring access to the network.
  Physical Downlink Control Channel (PDCCH): The main purpose of this physical channel is to carry scheduling information.
  Physical Hybrid ARQ Indicator Channel (PHICH): This channel is used to report the Hybrid ARQ status.
  Physical Downlink Shared Channel (PDSCH): This channel is used for unicast and paging functions.
  Physical Multicast Channel (PMCH): This physical channel carries system information for multicast purposes.
  Physical Control Format Indicator Channel (PCFICH): This channel provides information to enable the UEs to decode the PDSCH.
Uplink (UL)
  Physical Uplink Control Channel (PUCCH): This channel is used to transport user signaling data from one or more UE that can transmit on the control channel. The PUCCH transports, for example, acknowledgment responses and retransmission requests, service scheduling requests, and channel quality information measured by the UE to the system.
  Physical Uplink Shared Channel (PUSCH): This channel is used to transport user data from one or more mobiles that can transmit on the shared channel.
  Physical Random Access Channel (PRACH): This uplink physical channel allows a UE to randomly transmit access requests when the UE attempts to access the wireless communication system.

Wireless communication systems may employ a relay scheme to relay user data and possibly control information between a base station (BS) and a mobile station (MS) through one or more relay stations (RS). A relay scheme may be used to enhance coverage, range, throughput and/or capacity of a base station. The relay stations can repeat transmissions to/from the BS so that MSs within communication range of a relay can communicate with the BS through the relay. The relays do not need a backhaul link because they can communicate wirelessly with both BSs and MSs. This type of network may be referred to as a multihop network because there may be more than one wireless connection between the MS and a hardwired connection. Depending upon the particular network configuration, a particular MS may gain network access via one or more neighbour relays and/or one or more neighbour BSs. In addition, relays themselves might have one or more available path options to connect to a particular BS. The radio link between a BS or RS and an MS is called an access link, while the link between a BS and an RS or between a pair of RSs is called a relay link.

Conventional relays operate in one of two different modes: transparent and non-transparent. A transparent RS does not transmit control information, such that a MS connected to a transparent RS receives control information directly from the BS, and the RS relays only data traffic. A non-transparent RS transmits control information and relays data traffic as well.

Hybrid automatic repeat-request (HARQ) operations can be used for error control in wireless communication systems. With HARQ, the receiver detects an error in a message and automatically requests a retransmission of the message from the transmitter. In response to receiving the HARQ request (a "NACK"), the transmitter retransmits the message until it is received correctly, unless the error persists. In one variation, HARQ combines forward error correction (FEC) with an error-correction code.

LTE uses asynchronous HARQ transmission on the DL. In asynchronous HARQ, the receiver does not know ahead of time when the retransmission is being sent, and therefore control information must be sent along with the data. This is accomplished by sending resource allocation messages on the PDCCH simultaneous to the corresponding PDSCH transmission. The advantage of this scheme is that the scheduling algorithm has considerable freedom in deciding which MSs are sent data during any subframe.

In LTE systems where transparent relays are used, a RS could help improve system performance by sending DL HARQ retransmissions to the MS at the same time as the BS. However, an issue arises as to how the BS and the RS can coordinate concurrent DL HARQ retransmission. Prior to retransmission, the RS has to know which physical resources (time and frequency) are used for retransmission of the packet by the BS so that the RS can use the same resources to transmit the same packet concurrently. However, since DL HARQ retransmissions are asynchronous, the BS sends PDCCH and PDSCH in one subframe for retransmission when a NACK is received. As the control signaling region and data transmission region are multiplexed contiguously in time division multiplexing (TDM) fashion, there is no guard time between the two regions. The PDCCH is transmitted in the first n (where n=1, 2 or 3) OFDM symbols in each subframe, and the PDSCH is transmitted through the remaining (N−n) OFDM symbols (where N is the number of OFDM symbols in each subframe). It is difficult for the RS to switch from reception mode to transmission mode between contiguous symbols. It is also difficult for the RS to both decode retransmission control information in the PDCCH and prepare retransmission in the PDSCH in the same subframe. Additionally, in some situations the number of PDCCH carried by PCFICH could vary from subframe to subframe, requiring the RS to decode PCFICH, determine the start of PDCCH and prepare retransmission in the PDSCH in the same subframe.

While use of synchronous HARQ (i.e. retransmissions are scheduled on predetermined subframes) might alleviate some of the aforementioned difficulties, such an approach could introduce undesirable restrictions on the scheduler.

A need exists for an improved scheme for downlink retransmissions in transparent relay systems.

SUMMARY OF THE INVENTION

In accordance with an aspect of the present invention, there is provided a method of providing downlink retransmissions to a mobile station in a wireless communication network, the wireless communication network comprising a base station communicatively linked to a transparent relay station. According to the method, the base station receives a request for a retransmission from the mobile station; schedules resources for the retransmission; signals scheduling information for the retransmission to the transparent relay station via a control link; and the transparent relay station receives the scheduling information for the retransmission on the control link; and sends the retransmission to the mobile station in a retransmit subframe on a retransmit frequency band.

In a further aspect of the present invention, there is provided a base station in a wireless communication network, the base station comprising a controller operable to: receive a request for a retransmission from a mobile station; schedule resources for the retransmission; signal scheduling information for the retransmission to a transparent relay station via a control link; and wherein the signaling of the scheduling information enables the transparent relay station to send the retransmission to the mobile station in a retransmit subframe on a retransmit frequency band.

In a further aspect of the present invention, there is provided a transparent relay station in a wireless communication network, the transparent relay station comprising a controller operable to: receive, on a control link from a base station, scheduling information for a retransmission to a mobile station; and send the retransmission to the mobile station in the retransmit subframe on the retransmit frequency band.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate embodiments of the invention by example only,

FIG. 10A illustrates another example DL HARQ retransmission scheme in accordance with embodiments of the present application; and FIG. 10B illustrates yet another example DL HARQ retransmission scheme in accordance with embodiments of the present application.

DETAILED DESCRIPTION

Figure 1:
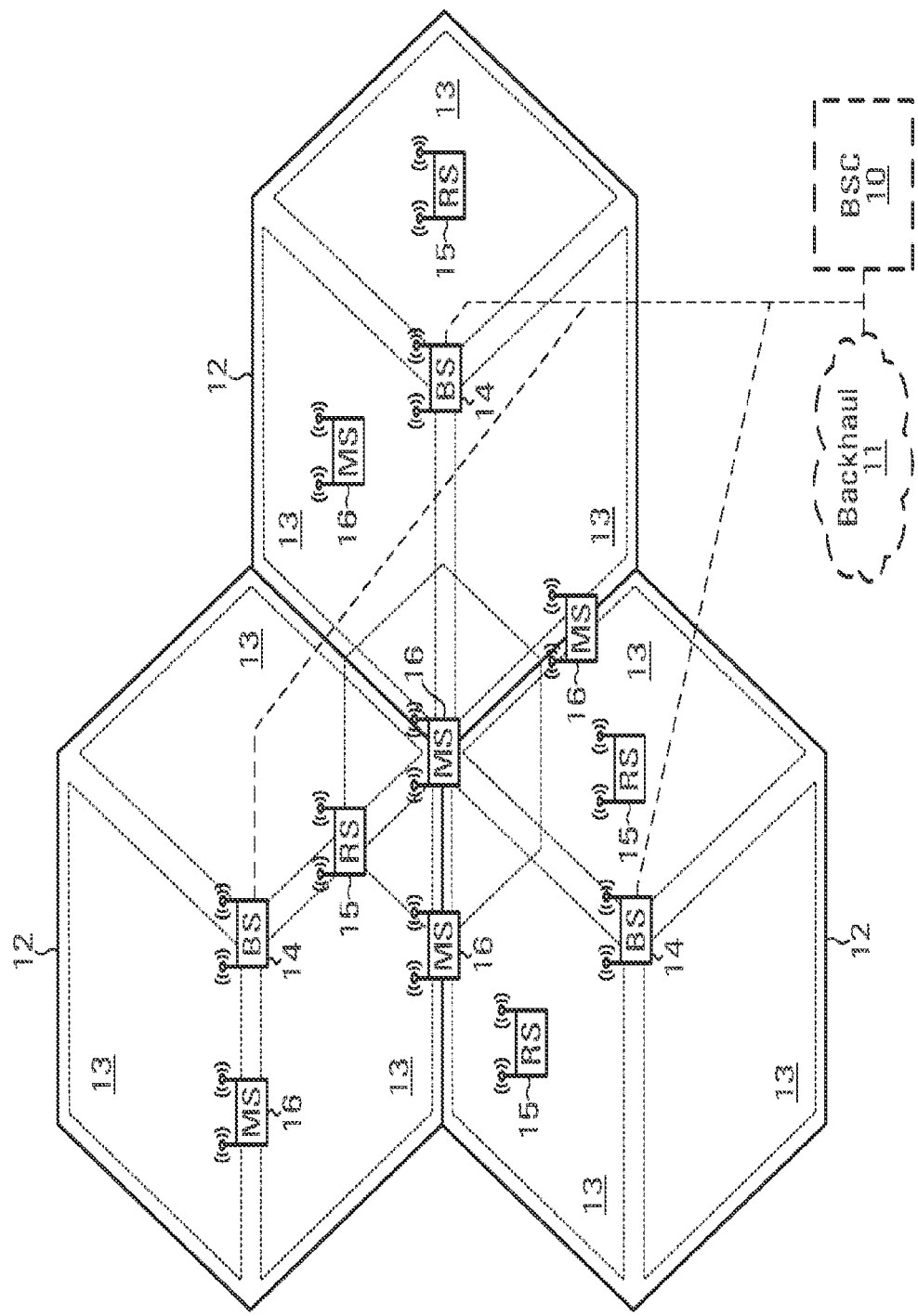
FIG. 1 is a block diagram of a cellular communication system.

Referring now to the drawing figures in which like reference designators refer to like elements, FIG. 1 shows a base station controller (BSC) 10 which controls wireless communications within multiple cells 12, which cells are served by corresponding base stations (BS) 14. In some configurations, each cell is further divided into multiple sectors 13 (not shown). In general, each base station 14 facilitates communications using OFDM with mobile terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. As described in more detail below, relay stations 15 may assist in communications between base stations 14 and mobile terminals 16. Mobile terminals 16 can be handed off 18 from any cell 12, sector 13 (not shown), base station 14 or relay 15 to an other cell 12, sector 13 (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
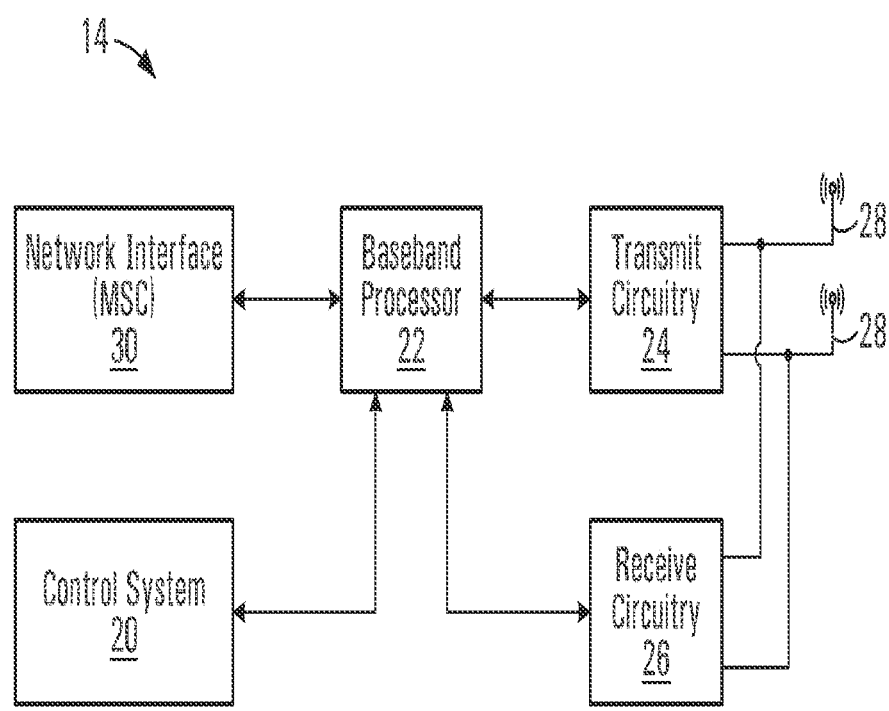
FIG. 2 is a block diagram of an example base station that might be used to implement some embodiments of the present application.

FIG. 2 depicts an example of a base station 14. Base station 14 generally includes a control system 20, a baseband processor 22, transmit circuitry 24, receive circuitry 26, antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
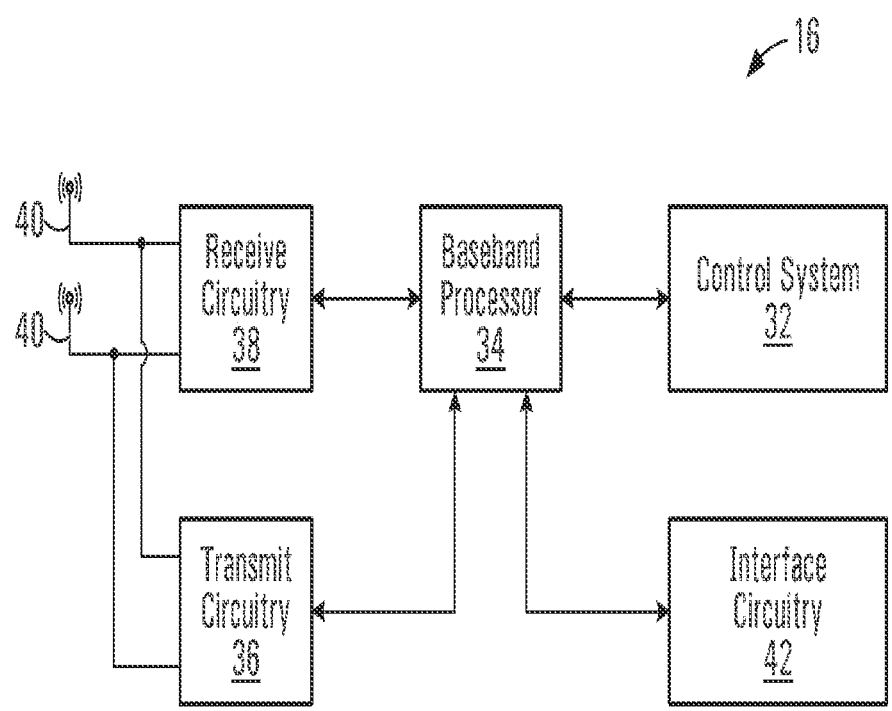
FIG. 3 is a block diagram of an example mobile terminal that might be used to implement some embodiments of the present application.

FIG. 3 illustrates an example of a mobile terminal 16. Similarly to the base station 14, the mobile terminal 16 will include a control system 32, a baseband processor 34, transmit circuitry 36, receive circuitry 38, antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

Figure 4:
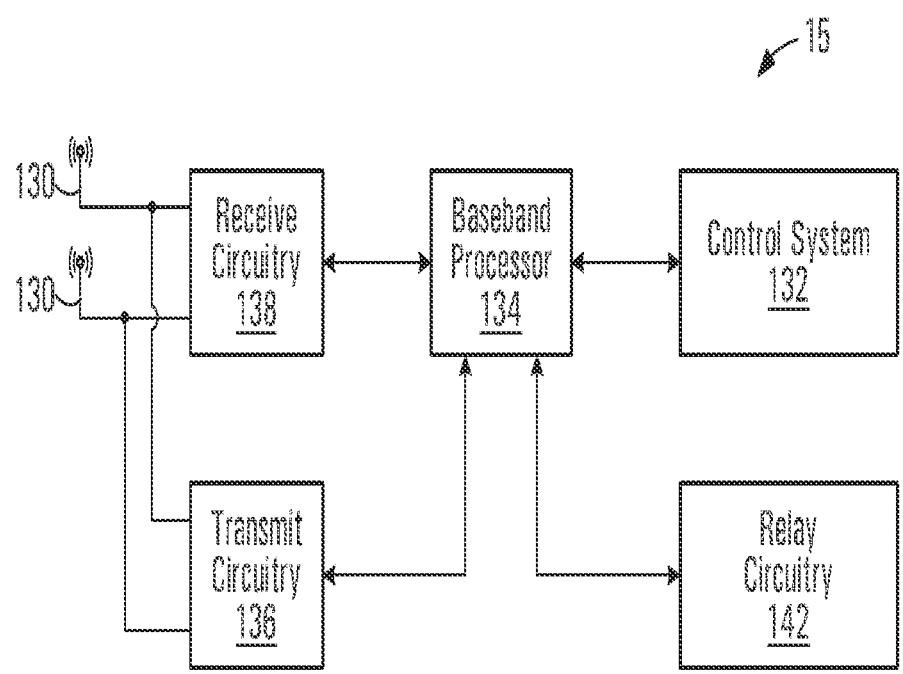
FIG. 4 is a block diagram of an example relay station that might be used to implement some embodiments of the present application.

FIG. 4 illustrates an example relay station 15. Similarly to the base station 14, and the mobile terminal 16, the relay station 15 includes a control system 132, a baseband processor 134, transmit circuitry 136, receive circuitry 138, antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

Baseband processor 134 processes the digitized received signal to extract the information or data bits conveyed in the received signal. This processing typically comprises demodulation, decoding, and error correction operations. Baseband processor 134 is generally implemented in one or more digital signal processors (DSPs) and application specific integrated circuits (ASICs).

For transmission, baseband processor 134 receives digitized data, which may represent voice, video, data, or control information, from control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

Figure 5:
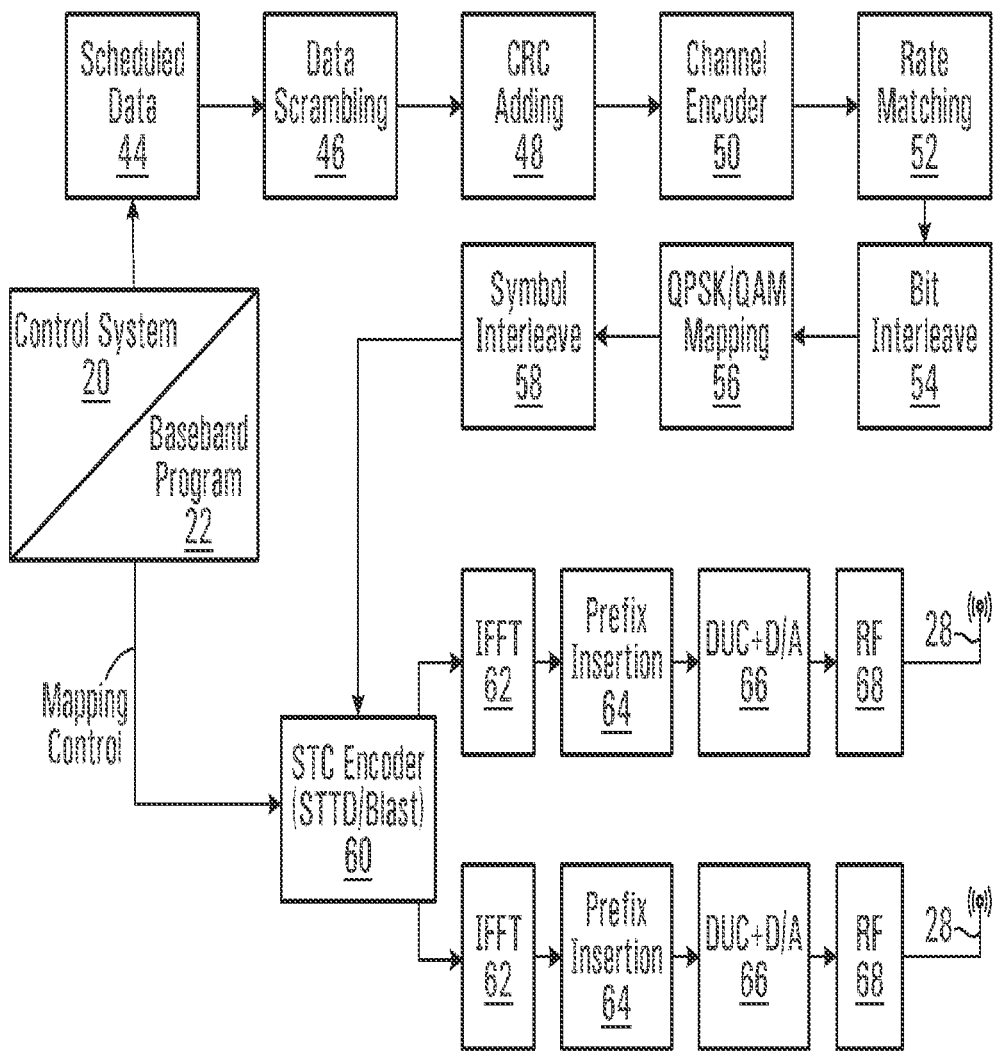
FIG. 5 is a block diagram of a logical breakdown of an example OFDM transmitter architecture that might be used to implement some embodiments of the present application.

With reference to FIG. 5, a logical OFDM transmission architecture will be described. Initially, base station controller 10 will send data to be transmitted to various mobile terminals 16 to base station 14, either directly or with the assistance of a relay station 15. As described in more detail below, base station 14 uses the channel quality indicators (CQI) values associated with the mobile terminals to schedule the data for transmission as well as select an appropriate modulation and coding scheme (MCS) level for transmitting the scheduled data. The CQI values may be received directly from the mobile terminals 16 or determined at the base station 14 based on information provided by the mobile terminals 16. In either case, the CQI value associated with each mobile terminal 16 may for example be a function of the signal-to-interference ratio (SIR), as well as of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. As described in more detail below, the channel coding for a particular mobile terminal 16 is based on the current CQI value associated with that mobile terminal. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. As described in more detail below, the degree of modulation is chosen based on the CQI value for the particular mobile terminal: The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with reference to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the SIC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the TUFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUG) and digital-to-analog (DIA) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 6:
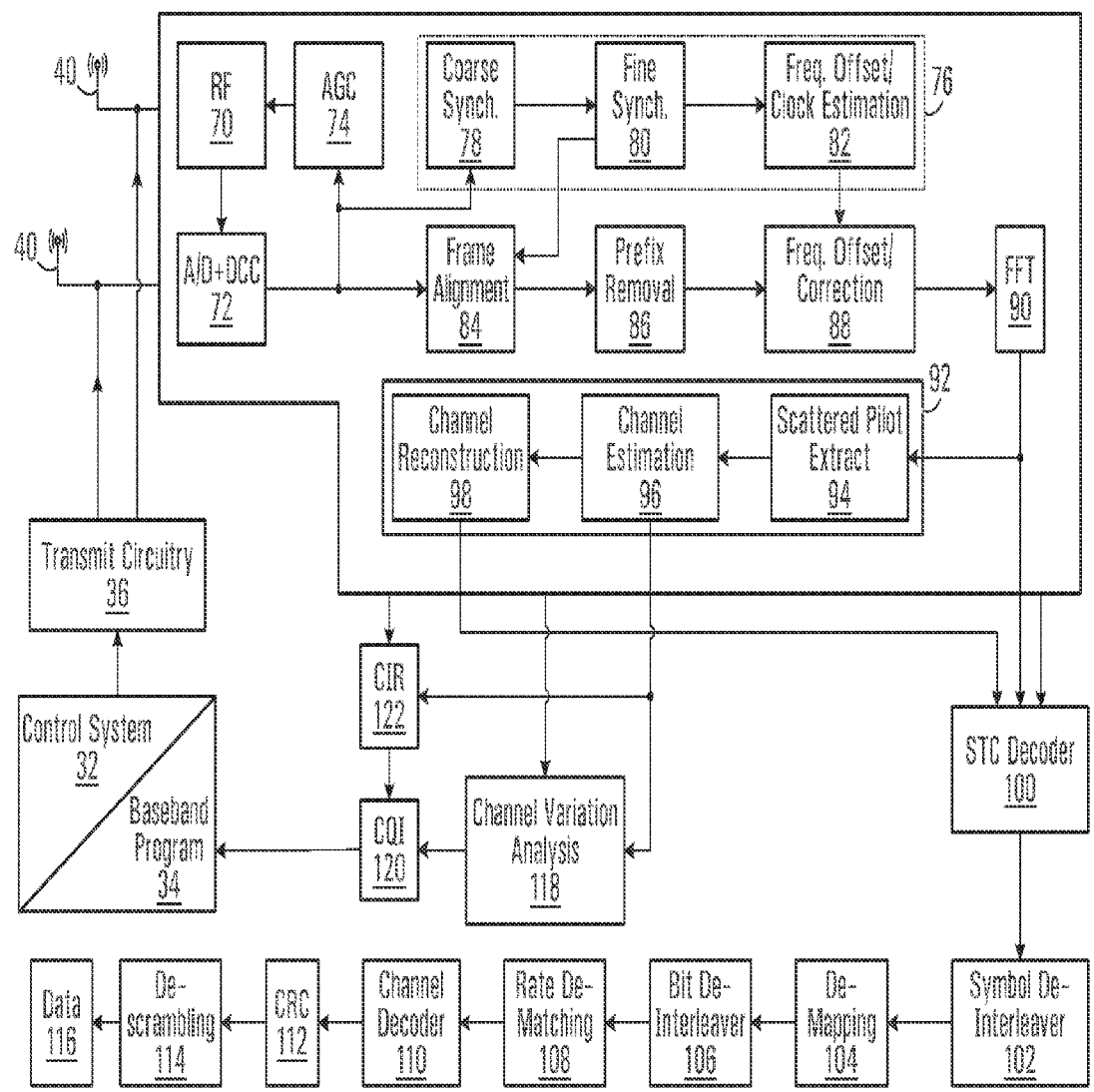
FIG. 6 is a block diagram of a logical breakdown of an example OFDM receiver architecture that might be used to implement some embodiments of the present application.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the-extracted pilot signal using channel estimation logic 96, and provides channel responses for all sub-carriers using channel reconstruction logic 98. In order to determine channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to STC decoder 100 sufficient to remove the effects of the transmission channel when processing the respective frequency domain symbols. The relay station could act as another base station or as a terminal in the context of this invention.

The recovered symbols are placed back in order using symbol de-interleaver logic 102, which corresponds to the symbol interleaver logic 58 of the transmitter. The de-interleaved symbols are then demodulated or de-mapped to a corresponding bitstream using dc-mapping logic 104. The bits are then de-interleaved using bit de-interleaver logic 106, which corresponds to the bit interleaver logic 54 of the transmitter architecture. The dc-interleaved bits are then processed by rate dc-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI value, or at least information sufficient to determine a CQI value at the base station 14, is determined and transmitted to the base station 14. As noted above, the CQI value may be a function of the signal-to-interference ratio (SIR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7A:
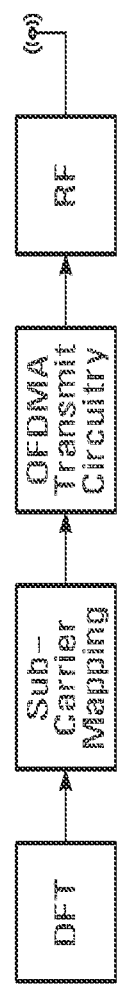
FIG. 7A is an example SC-FDMA transmitter.
Figure 7B:
FIG. 7B is an example SC-FDMA receiver.

In some embodiments, Single Carrier Frequency Division Multiple Access (SC-FDMA) is used for uplink transmissions from mobile station 16. SC-FDMA is a modulation and multiple access scheme introduced for the uplink of 3GPP LTE broadband wireless fourth generation (4G) air interface standards, and the like. Referring to FIGS. 7A and 7B, an example SC-FDMA transmitter and receiver for single-in single-out (SISO) configuration is illustrated provided in accordance with one embodiment of the present application. In SISO, mobile stations transmit on one antenna and base stations and/or relay stations receive on one antenna. FIGS. 7A and 7B illustrate the basic signal processing steps needed at the transmitter and receiver for the LTE SC-FDMA uplink. There are several similarities in the overall transceiver processing of SC-FDMA and OFDMA. Those common aspects between OFDMA and SC-FDMA are depicted generally as "OFDMA transmit circuitry" and "OFDMA receive circuitry", as they will be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA subcarriers are not independently modulated as in the case of the OFDMA subcarriers. As a result, the peak-to-average power ratio (PAPR) of the SC-FDMA signal is lower than the PAPR of the OFDMA signal. Lower PAPR greatly benefits the mobile terminal in terms of transmit power efficiency.

FIGS. 1 to 7 provide one specific example of a communication system that could be used to implement embodiments of the application. It is to be understood that embodiments can be implemented with communications systems having architectures that are different than the specific example, but that operate in a manner consistent with the implementation of the embodiments as described herein.

In accordance with embodiments of the present application, relay station 15 is capable of assisting DL retransmissions (e.g. DL HARQ retransmissions) while operating in transparent mode. More specifically, base station 14 is configured to signal retransmission information to relay station 15 over a control link (herein referred to as a "network-to-relay link"), which may be either in-band or out-of-band, prior to sending a retransmission so that relay station 15 may send the retransmission concurrently with base station 14 (e.g. within the same OFDMA subframe).

Figure 8:
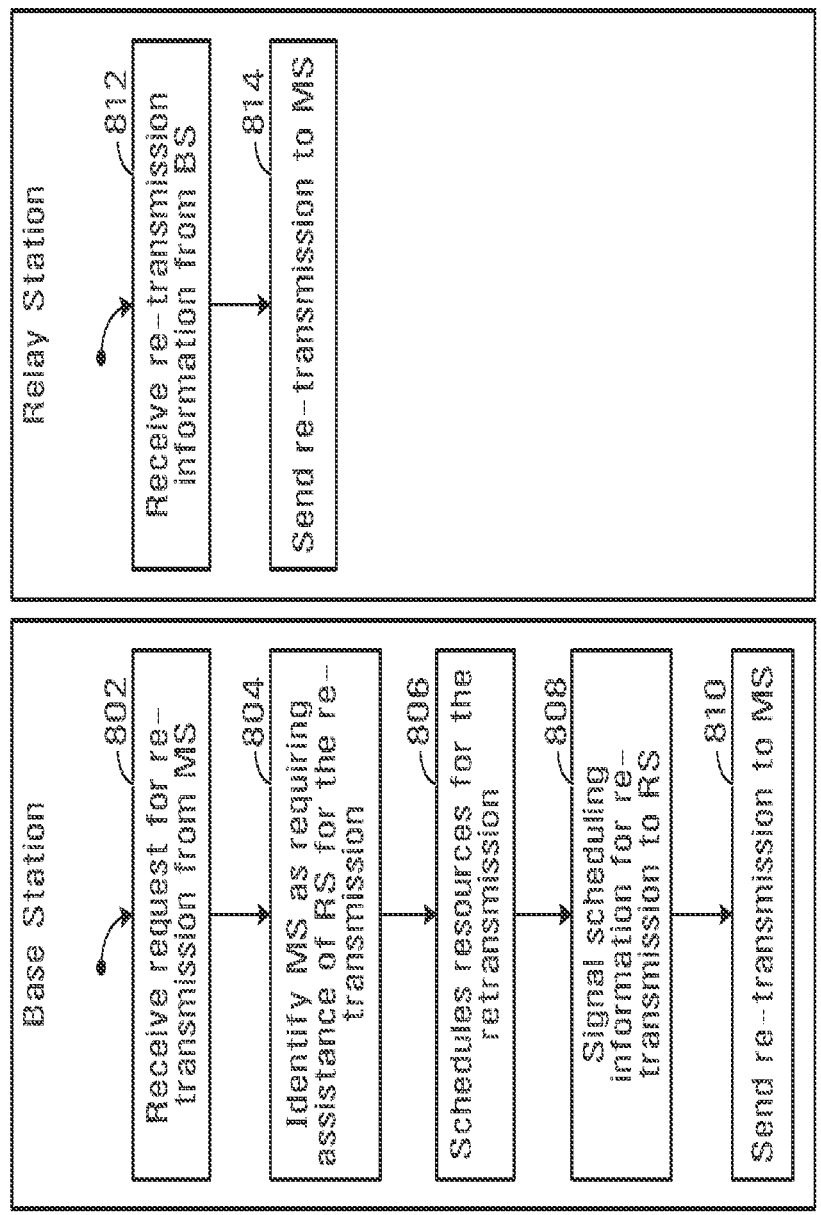
FIG. 8 illustrates an example DL HARQ retransmission scheme in accordance with embodiments of the present application.

FIG. 8 shows a flow diagram illustrating the steps for a DL retransmission assisted by a transparent relay according to embodiments of the present application. As shown, at step 802 a base station (BS) receives a request for a retransmission (e.g. a HARQ NACK) from a mobile station (MS). At step 804, the BS identifies the MS as being at or near the cell edge and potentially requiring the assistance of a transparent relay station (RS) for the retransmission. At step 806, the BS schedules resources for the retransmission, and at step 808 the BS signals the scheduling information for the retransmission to the RS via the network-to-relay link. As explained in more detail below, in some embodiments resources for the retransmission may be scheduled one subframe ahead of the retransmission. It is noted that with the assistance of the RS for retransmission, the requirement on the scheduler to capture instantaneous channel variations is eased. At step 810, BS sends the scheduled retransmission to the MS. At the RS, at step 812 the RS obtains the retransmission information, and at step 814 the RS sends the scheduled retransmission to the MS concurrently with, and on the same frequency band as, the BS.

Figure 9:
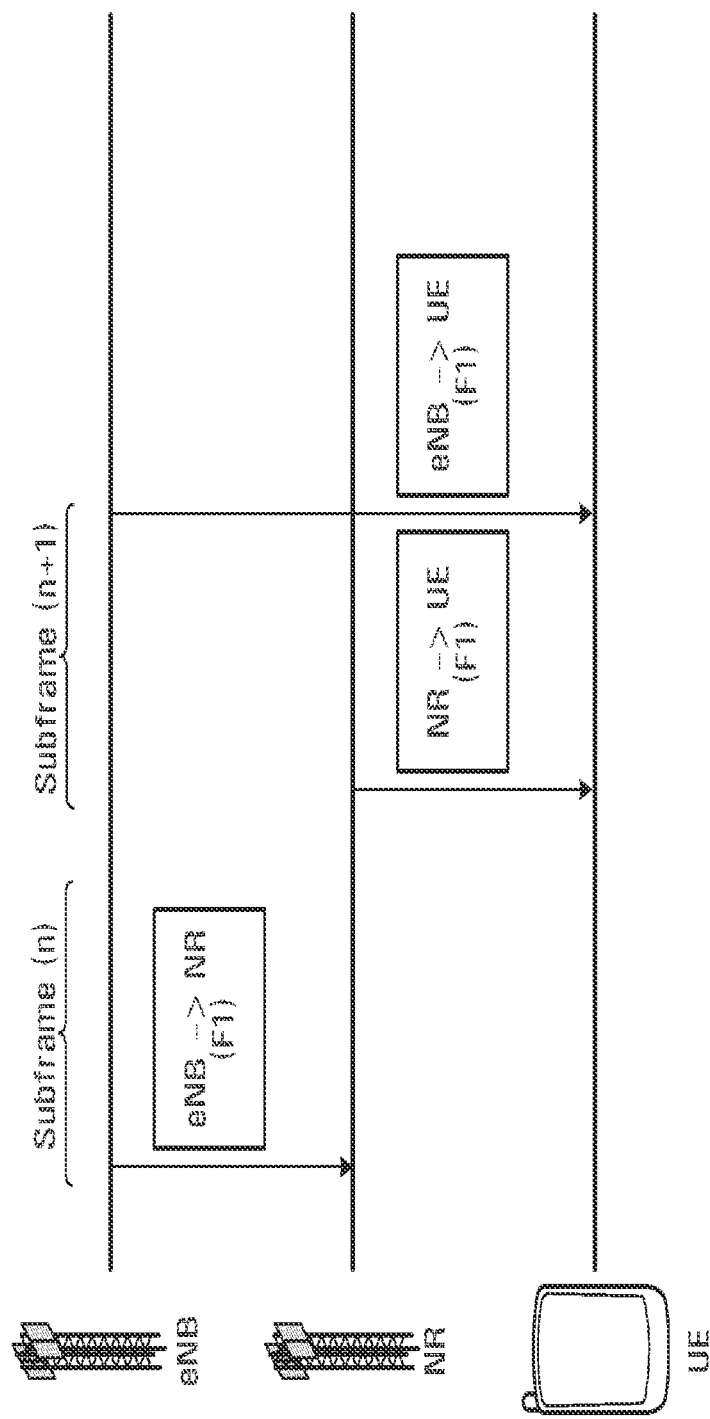
FIG. 9 shows a flow diagram illustrating the steps for a DL HARQ retransmission according to the scheme of FIG. 8.

FIG. 9 illustrates a DL retransmission scheme where the network-to-relay link is in-band; that is, the network-to-relay link occupies the same frequency band F1 as the network-to-mobile access link. As shown, in subframe (n) NR receives retransmission information from the base station (eNB) on frequency band F1, and in subframe (n+1) the relay station (NR) sends the retransmission data to UE concurrently with base station 14, with both retransmissions occurring on the same frequency band F1. The in-band network-to-relay link could use some reserved resources in PDSCH or PDCCH. A new control channel format may defined, for example, a PDCCH for a group of cell edge mobile stations may be defined.

FIGS. 10A and 10B illustrate DL HARQ retransmission schemes where the network-to-relay link is out-of-band; that is, the network-to-relay link and the network-to-mobile access link occupy different frequency bands F2 and F1, respectively. In some embodiments, frequency band F2 assigned for the network-to-relay link may be a dedicated frequency band. For example, in some embodiments, F2 may be 'new' spectrum such as the 2.5 GHz band. As shown, NR receives signals from eNB and transmits signals to UE on different frequency bands. Two options are presented. In a first option illustrated in FIG. 10A, eNB transmits the HARQ related PDCCH in subframe (n), and NR transmits the retransmission data to the UE in subframe (n+1). In a second option illustrated in FIG. 10B, eNB transmits the HARQ related PDCCH in subframe (n), and NR transmits the retransmission data to the UE in subframe (n). In embodiments adopting the second option, a different control channel format may be defined for NR oriented PDCCH to provide sufficient guard time to allow NR to decode its PDCCH before the corresponding PDSCH is to be sent.

Advantageously, the schemes herein described enable relay stations 15 operating in transparent mode to send DL retransmissions to the mobile stations 16 concurrently with base station 14, thus increasing the robustness of the transparent relay system and enhancing its performance.

Other modifications will be apparent to those skilled in the art and, therefore, the invention is defined in the claims.

What is claimed is:

1. A method of providing downlink (DL) retransmissions to a mobile station in a wireless communication network, said wireless communication network comprising a base station communicatively linked to a transparent relay station, said method comprising:
   at said base station:
      receiving a request for a retransmission from said mobile station;
      scheduling resources for said retransmission;
      signaling, using a physical downlink control channel (PDCCH) in a long term evolution (LTE) network or an LTE advanced (LTE-A) network, scheduling information for said retransmission to said transparent relay station via a control link on a first frequency band using a first format, wherein the first format is different from a second format used for signaling scheduling information to a mobile station;
   at said transparent relay station:
      receiving, at said transparent relay station, said scheduling information for said retransmission on said control link during a subframe in the first frequency band; and
      in response to receiving said scheduling information in the subframe, sending, using a physical downlink shared channel (PDSCH) in the LTE network or the LTE-A network, said retransmission from said transparent relay station to said mobile station in the subframe on a retransmit frequency band, wherein the retransmit frequency band is different from the first frequency band.

2. The method of claim 1, wherein the mobile station is a cell-edge mobile station.

3. The method of claim 1, wherein the base station is a long term evolution eNB.

4. A system for providing downlink retransmissions to a mobile station in a wireless communication network, the system comprising:
   a base station comprising a processor configured to:
      receive a request for a retransmission from said mobile station,
      schedule resources for said retransmission,
      signal, using a physical downlink control channel (PDCCH) in a long term evolution (LTE) network or an LTE advanced (LTE-A) network, scheduling information for said retransmission to said transparent relay station via a control link on a first frequency band using a first format, wherein the first format is different from a second format used for signaling scheduling information to a mobile station; and
   a transparent relay station in communication with the base station and comprising a processor configured to:
      receive said scheduling information for said retransmission on said control link during a subframe on the first frequency band; and
      in response to receiving said scheduling information in the subframe, send, using a physical downlink shared channel (PDSCH) in the LTE network or LTE-A network, said retransmission from said transparent relay station to said mobile station in the subframe on a retransmit frequency band, wherein the retransmit frequency band is different from the first frequency band.

5. The system of claim 4, wherein the mobile station is a cell-edge mobile station.

6. The system of claim 4, wherein the base station is a long term evolution eNB.

7. A transparent relay for providing downlink retransmissions to a mobile station in a wireless communication network, comprising:

one or more processors configured to:

receive, from a base station using a physical downlink control channel (PDCCH) in a long term evolution (LTE) network or an LTE advanced (LTE-A) network, scheduling information for a retransmission on a control link during a subframe on a first frequency band, wherein the base station schedules resources based on a request for a retransmission from the mobile station, the scheduling information for the retransmission is transmitted using a first format, the first format being different from a second format that is used for transmitting scheduling information to a mobile station; and in response to receiving the scheduling information in the subframe, transmit, using a physical downlink shared channel (PDSCH) in the LTE network or the LTE-A network, the retransmission from the transparent relay station to the mobile station in the subframe on a retransmit frequency band, wherein the retransmit frequency band is different from the first frequency band.

8. The transparent relay of claim 7, wherein the mobile station is a cell-edge mobile station.

* * * * *

UNITED STATES PATENT AND TRADEMARK OFFICE
CERTIFICATE OF CORRECTION

PATENT NO. : 9,622,229 B2
APPLICATION NO. : 13/620385
DATED : April 11, 2017
INVENTOR(S) : Xu et al.

Page 1 of 1

It is certified that error appears in the above-identified patent and that said Letters Patent is hereby corrected as shown below:

On the Title Page

Item (54) and in the Specification, Column 1, Line 1 (Title) Delete "NETWORK RELAY" and insert -- NETWORK-RELAY --, therefor.

Signed and Sealed this
Tenth Day of July, 2018

Andrei Iancu
*Director of the United States Patent and Trademark Office*